United States Patent [19]

Van Huisen

[11] 3,957,108

[45] May 18, 1976

[54] MULTIPLE-COMPLETION GEOTHERMAL ENERGY PRODUCTION SYSTEMS

[76] Inventor: Allen T. Van Huisen, 29456 Indian Valley Road, Rolling Hills Estates, Calif. 90274

[22] Filed: Oct. 3, 1974

[21] Appl. No.: 511,810

Related U.S. Application Data

[62] Division of Ser. No. 375,751, July 2, 1973.

[52] U.S. Cl. ................................ 165/45; 60/641; 165/1; 166/302
[51] Int. Cl.² .......................................... F03G 7/02
[58] Field of Search .............. 165/1, 45; 60/641; 166/302, 314, 50

[56] References Cited
UNITED STATES PATENTS

| | | | |
|---|---|---|---|
| 3,140,986 | 7/1964 | Hubbard | 60/641 |
| 3,195,634 | 7/1965 | Hill | 166/302 |
| 3,454,094 | 7/1969 | Grolemund | 166/302 |
| 3,470,943 | 10/1969 | Van Huisen | 60/641 |
| 3,520,367 | 7/1970 | Needham | 166/302 |
| 3,637,021 | 1/1972 | Hutchinson | 166/302 |
| 3,662,832 | 5/1972 | Keeler | 166/302 |
| 3,805,885 | 4/1974 | Van Huisen | 165/45 |
| 3,817,038 | 6/1974 | Paull | 60/641 |

Primary Examiner—Charles J. Myhre
Assistant Examiner—Daniel J. O'Connor

[57] ABSTRACT

A system for the mining of geothermal energy in which a plurality of geothermal wells radiate from a single surface site into a subsurface geothermal reservoir. The wells can be drilled by conventional slant drilling techniques and each may contain a closed end heat exchanger which receives water and generates steam. Some of the heat exchangers are disposed vertically and others are implanted horizontally. By alternating production of the wells in a programmed cyclical manner, convective movement of the hydrothermal fluid will occur within the geothermal zone. The generated steam is collected in a reservoir at the surface site and utilized to generate electricity. The condensate from the turbine can be recycled to the wells.

6 Claims, 6 Drawing Figures

MULTIPLE-COMPLETION GEOTHERMAL ENERGY PRODUCTION SYSTEMS

CROSS REFERENCE TO RELATED APPLICATION

This application is a division of application Ser. No. 375,751, filed July 2, 1973.

BACKGROUND OF THE INVENTION

1. Field of the Invention

The present invention relates to utilization of geothermal energy and more particularly to an improved system for maximizing the transfer of geothermal energy from a subsurface zone to the surface for utilization.

2. Description of the Prior Art

There exists, essentially untapped, massive quantities of heat available from magma which has migrated to zones close to the surface. Such conditions exist in large regions of the United States and in other locations throughout the world such as in Italy, New Zealand and Japan. Frequently, tectonic activity has produced fault lines which have permitted deep, subsurface waters to come in contact with magmatic rocks and return to the surface along fault lines as heated water, or in a few cases as steam. Similarly, tectonic acitivity below ancient subsidence areas, more recently overlain, have resulted in migration of heat into brine pools of varying salinity which lodged in these sinks. There are some 1.8 million acres in the United States which are designated as KGRA (Known Geothermal Resource Areas) and most of these KGRA are situated in the Western states.

The only operating geothermal plants in the United States are those operating at The Geysers, Sonoma, Calif., and others are formulating plants for geothermal power development in the Imperial Valley of California. The plants in operation in the United States and Italy rely on direct thermal fluid mining methods. Such methods have entailed serious problems due to the high salinity of the steam causing cavitation, abrasion, scaling and corrosion of the equipment over short intervals. Moreover, geological prospecting techniques are not very accurate and if a dry well results or a well with insufficient steam pressure the venture is a total loss. Drilling of adjacent thermal direct fluid recovery wells entails the risk of lowering the bottom hole pressure of the whole field. It is estimated that a brine pool exists in the Niland area of the Imperial Valley of California which occupies an area of 25 square miles. About a dozen geothermal wells have been drilled in the area, which produce as much as a million pounds per hour of brine per well for sustained periods. Flashing this brine would produce about 200,000 pounds per hour of steam which in turn could produuce about 10,000 kW of electric power per well.

However, because of the high salinity of the brines, all attempts to utilize these brines have been unsuccessful. Since the discovery of these wells, several companies have spent millions of dollars trying to extract chemicals and generate power from the brines. Neither operation has been commerically successful because of the high operating costs and associated material costs necessary to withstand the corrosive and erosive environment and to dispose of the salt and concentrated salt bitterns.

Further to the South in Mexico, another brine pool exists of a size comparable to the Niland pool. The brine is lower in salinity in this pool. Exploratory investigation suggests the existence of seven or eight similar brine pools between Niland and the pool at Cerro Prieto in Mexico. In all, the power generating potential from geothermal energy in the Imperial Valley is estimated to be as high as 30,000 MW. Successful exploitation of this potential by conventional direct thermal mining methods would require either selective use of the lower salinity brine or disposal of vast amounts of salt and concentrated salt bitterns. Geothermal energy represents a clean, pollution free alternative to fossil fuel energy sources and does not entail the hazards or the environmentally unacceptable aspects of nuclear produced power.

The problems inherent in the conventional direct thermal mining approaches are avoided by use of the downhole heat exchanger disclosed in U.S. Pat. No. 3,470,943 since the geothermal brines remain in the pool and heat is extracted by in situ circulation of a clean, stable, secondary heat transfer fluid inside the downhole heat exchanger which is placed at the lower part of the casing within the geothermal zone. Thus, the downhole heat exchanger provides a means for utilizing the heat contained in the brine pools by extracting only the heat energy, leaving the brine recirculating in the underground pool. The advantages are many.

No saline fluids are brought to the surface; hence there are no disposal problems and reinjection wells are not required. The reservoir inventory and pressure is undisturbed. Except for extraction of heat, which is readily replenishable, nothing has been changed in the reservoir. Subsidence therefore will be avoided by this method.

Since the interior of the casing is contacted only by pure fluids, no corrosion or scaling will occur internally. The outside of the casing is in contact with the reservoir aquifer but the brine is at a pressure which does not allow the dissolved salts to precipitate. Hence, there is no abrasive action from the solids as in a flowing well. The convective currents within the aquifer are expected to be of insufficient velocity to result in abrasion. The low velocity should also promote the retention of a thin, passive coating of corrosion products which inhibit further corrosion.

The downhole heat exchanger system represents a truly non-polluting source of energy in that no pollution products are permitted to reach the surface. However, the energy capacity of a single well is not sufficient to justify the installation and operation of a generation plant. Therefore, multiple wells are required to develop sufficient steam to operate the turbine generator. This requires the utilization of a greater area of the surface for drilling the multiple wells and a greater investment cost to drill the well at each site. Furthermore, the separate location of the multiple wells requires water injection lines running to each well site and steam gathering lines running from each site to the generating plant. All of this involves capital investment and entails heat loss each time the steam or water is moved.

SUMMARY OF THE INVENTION

The multiple-completion geothermal system of the invention generally includes a plurality of geothermal wells, each having a first end converging toward and meeting at a first point and having a second end diverging from said point and terminating in a geothermal zone, each second end being spaced from any other second end of said geothermal wells. This system further includes a reservoir located at said first point receiving heated geothermal fluid from the second end of each well, outlet means connected to said reservoir for conducting the heated geothermal fluid in turn to separation means and energy conversion means. The system in accordance with the invention also may include control means for sequentially activating production from each of the plurality of wells in sequence to promote movement of hydrothermal fluids within the geothermal zone.

Depending on the condition of the geothermal zone, the system may require further structure. In a wet geothermal zone, the fluid will operate as a carrier for the heat energy to deliver it to the surface under pressure. In the case of a dry geothermal zone or one containing a molten brine pool with insufficient pressure, the implantation of closed end heat exchangers at the ends of the wells requires means for conducting heat exchange fluid to the heat exchangers which may be connected to the turbine to return the condensate to the heat exchanger in a closed cycle loop. Heat transfer to the heat exchanger in a dry geothermal zone may also be enhanced by injection os water into the zone external to the heat exchanger to create hot fluid to increase the transfer rate of heat to the outside surface of the heat exchanger.

It is apparent that the system of the invention minimizes the amount of surface area needed for access to the subsurface geothermal zone, the amount of surface area needed for collection and conversion of the geothermal fluid to electrical energy and minimizes the external piping conduits and energy loss that would be entailed in the separate spaced drilling of multiple wells to tap and mine the geothermal energy in a known geothermal resource area. The system of the invention also includes provision for controlled collection of the energy and in a manner to promote convection and movement of the hydrothermal fluids to increase the rate of energy recovery and to decrease the possibility of scaling and fouling the external portions of the wells being utilized for collection and transfer of heat.

These and many other objects and attendant advantages of the invention will become apparent as the invention becomes readily understood by reference to the following detailed description when considered in conjunction with the accompanying drawings.

DESCRIPTION OF THE PREFERRED EMBODIMENTS

Figures 1, 2:
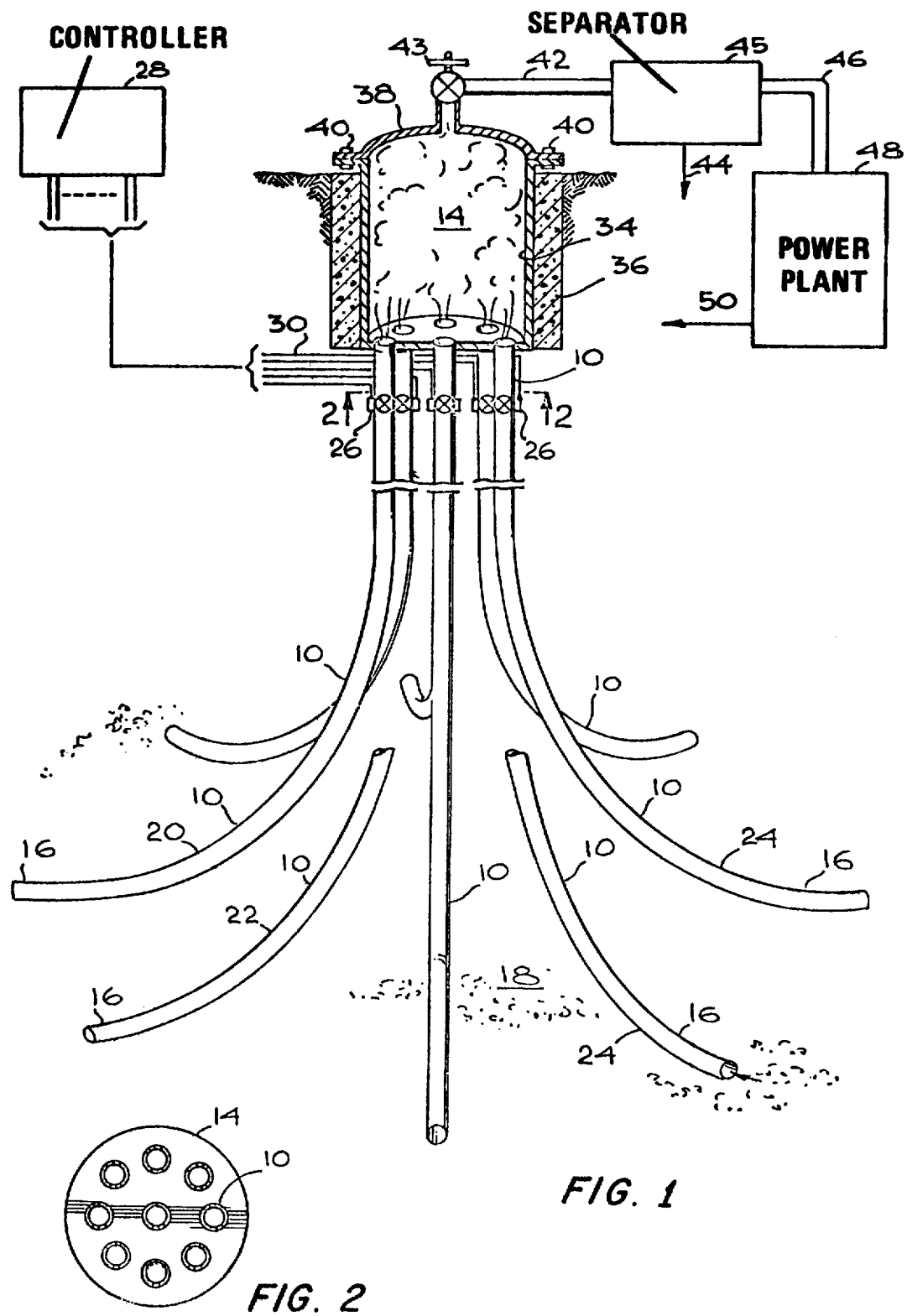
FIG. 1 is a perspective view of a multiple-completion geothermal mining system in accordance with the invention.
FIG. 2 is a sectional view taken along line 2—2 of FIG. 1.

Referring now to FIGS. 1 and 2, the system includes a plurality of geothermal wells 10 each having a first, open, upper end 12 converging toward and meeting within a surface point bounded by a closed reservoir 14. The lower end 16 of each well terminates within a geothermal zone 18. The ends are positioned in a predetermined pattern such as those of wells 20 and 22 which are spaced vertically from each and the ends of wells 20 and 24 which are spaced horizontally from each other.

Each well contains a valve 26, suitably a servo-controlled valve such that production from each well can be individually controlled, suitably by a time sequencer controller 28 which activates or deactivates each valve 26 according to a predetermined program by sending signals through lines 30. The sequential production of wells 10, especially by rotating production in a circular pattern, will promote convective movement of the hydrothermal fluid 32 within the geothermal zone 18, and thus, increase heat transfer and recovery and decrease the possibility of scale forming on the external surface 24 of the portion of the well casings within the zone 18.

The geothermal, heated fluid recovered from the wells collects within the reservoir 14. The reservoir may be located on the surface but is preferably recessed below the surface to take advantage of the insulating and warming effects of the subsurface strata. The reservoir is preferably a steel vessel 34 bounded by a concrete layer 36 and includes a removable lid 38 secured by bolts 40.

The collected steam is transferred through conduit 42 containing a pressure regulating valve 43 to a separator 45. Condensate and solids are removed through line 44 and the steam is delivered through line 46 to the power plant 48. The power plant can be a direct prime mover engine or a turbine generator. Condensate is removed through line 50 and may be recovered or recycled to the wells.

Geothermal fields are classified according to their production of hot water, hot water and steam, or dry steam. The system of FIG. 1 can be used for the recovery of geothermal heat values from all of these types of fields. Hot water fields typically produce temperatures between 60°C and 100°C, with gradients of 30°C/km to 70°C/km. Because of the low enthalpy, hot water fields are not now being used to generate electricity. They are being used instead for space heating and air conditioning. For electrical production most geothermal fields produce both water and steam at temperatures greater than 100°C. The highest temperature field in use to date is at Cerro Prieto, Mexico, at which temperatures have been measured up to 380°C. Similarly, the dry steam fields in commercial use have temperatures at 210°C (The Geysers, U.S.) to 260°C (Larderello, Italy).

The geothermal fields in production have the following basic geological characteristics:

1. A Source of Heat.

In general, magmatic intrusions at shallow depths of 7 to 15 km provide a heat source at a temperature above 100°C, typically from 200°C to 400°C.

2. A Source of Water.

Commercial wells produce more than 20 tons/hour of water and steam. The best well, located in the Cerro Prieto field, produces 350 tons/hour. The water is believed to come from surface sources rather than being magmatic water. Therefore, it is probably replenishable at a rate determined by pressure, permeability, source availability and other factors. Reinjection may be utilized to replenish the source and dispose of unwanted surface water such as condensate from the turbine.

3. A Permeable Rock Aquifer.

Almost any permeable rock can serve as an aquifer such as deltaic sand, volcanic turf, base salt flows, ignimbrite, greywacke, carbonate volcanics and limestone. Convection currents through the rock are believed to be the primary heat transfer mechanism between the magma and upper levels of the aquifer; these can be reached by drilling. Pressures in the aquifer may be as high as 2000 psi or more. Both thermal conductivity and permeability are critical parameters which limit the energy production of the well.

4. A Cap Rock.

A rock layer of low permeability is required above the aquifer to limit the heat transfer by convection. The heat loss transfer through the cap rock to the surface primarily by convection is very low; this allows the system to remain hot. Many systems are believed to be self-sealing due to mineral, primarily silica, depositions of the hot water flashed and cold near the surface.

All of these geothermal aquifers can be mined by direct thermal mining methods in the system of the invention which will provide the same advantages of collection of the thermal fluid at a single point, thus reducing capital investment and well installation costs and the surface area needed for converting the fluid to mechanical or electrical energy. However, for the reasons previously discussed, the wet geothermal areas can more efficiently be mined by the downhole heat exchanger relation of the multiple-completion system of this invention. Dry geothermal areas may also be mined by either method. A man-made aquifer may be developed by explosion-stimulated methods. If the hole is hot and dry and not fractured, a large aquifer could be developed by hydrofracturing alone or in combination with explosive induced means. The downhole heat exchanger offers the opportunity to recover heat from the dry and hot geothermal area without the need to inject water to the zone to create a hydrothermal fluid.

If the system is hot, dry and fractured, water can be introduced from the surface internal of the well casing or external of the well casing and the resultant steam collected through the annulus of the well removed and harnessed to produce energy. If the system is hot, dry and unfractured, it may be utilized as such with the downhole heat exchanger to produce steam by indirect heat exchange methods or hydrofracturing and enhancement can be practiced through additional thermal stress fracturing or by the use of high explosive or nuclear devices to fracture large quantities of hot rock as described in my copending application Ser. No. 99,898, filed Dec. 21, 1970, which disclosed a system for producing a rubble cone cavity in a hot, dry rock geothermal zone, the disclosure of which is incorporated herein by reference.

Referring again to FIGS. 1 and 2, in a system for mining wet geothermal energy, the separator 45 would be a flash unit and the wet steam is delivered to the power plant 48 while the separated salts and condensate are removed through line 44. The salts may be separated into commercial salts for sale, may be concentrated and disposed or may be reinjected into the zone. In a system in which fairly dry steam is directly recovered, separation of solids may be required in a cyclone separator to minimize cavitation of the turbine blades.

Figure 3:
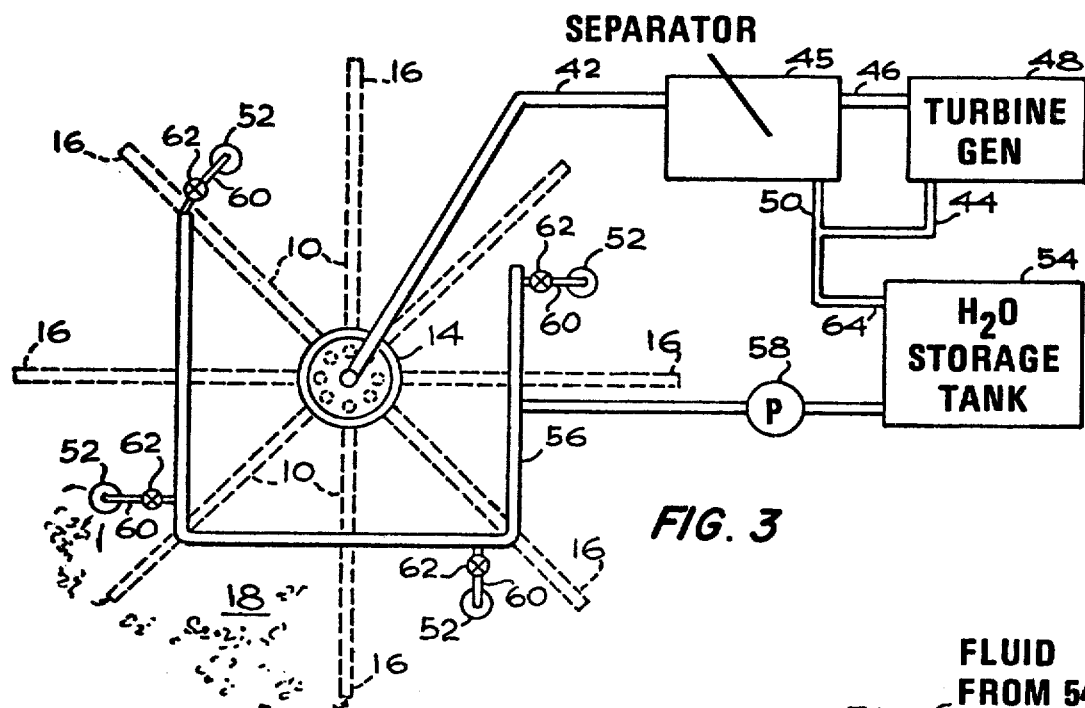
FIG. 3 is a schematic view of a further embodiment of a mining system in accordance with the invention.
Figure 4:
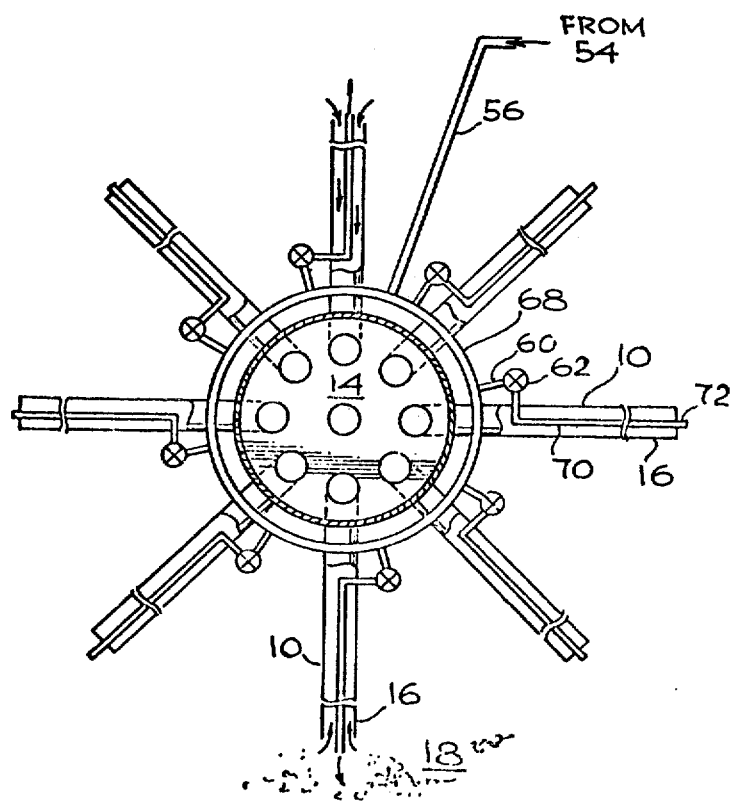
FIG. 4 is a top enlarged view of the system of FIG. 3.

Hydrothermal injection systems for mining a dry field are illustrated in FIGS. 3 and 4. Referring now to FIG. 3, an external water injection system is illustrated in which water is injected into the dry, porous geothermal zone 18 by means of a plurality of water injection wells 52. The wells are spaced about the periphery of the geothermal zone being mined and extend from the surface to the zone 18 and preferably extend below the level of the ends 16 of the geothermal wells 10, so as to form a rising body of pressurized, heated hydrothermal fluid. The water injection wells 52 can be supplied separately with water, or as illustrated can be supplied from a central storage tank 54 and pumped by means of pump 58 through line 36 to each of the injection wells 52.

The branch input conduit 60 to each injection well 52 contains a valve 62 so that production may be cycled to induce movement of the hydrothermal fluid. The hydrothermal fluid enters the ends 16 of the recovery wells 10, collects in reservoir 14 and is transferred through line 42 to the separator 45 and turbine generator 48. Condensate in lines 50 and 44 is recycled through line 64 to the storage tank 54 for reinjection in the zone 18 through wells 52.

A preferred injection-recovery system is illustrated in FIG. 4. In this system, water injection is internal of the recovery well casing. This again simplifies the installation, minimizes surface installation of long lengths of pipes and totally obviates the necessity of separate injection wells. A further incidental benefit is that the decending water is heated by the ascending geothermal fluid. As shown in the drawings, the delivery pipe 56 is connected to a single distribution ring 68 which may surround the outside of the casing for recovery wells 10 or may be positioned on the inside surface of the casings. The branch inlets 60 again contain a valve 62. The inlets 60 sealingly penetrate the casing of each well 10 and are connected to a water injection pipe 70. The end 72 of the water injection pipe preferably extends past the end 16 of the casing and into the porous or fractured geothermal zone 18 at a depth below the ends 16 of the casing 10.

Figure 5:
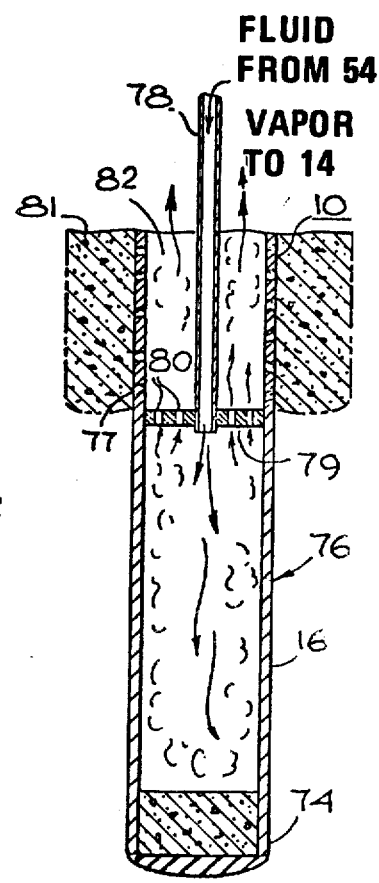
FIG. 5 is an enlarged cross-sectional view of a closed end heat exchanger.

All of the hydrothermal systems suffer from the common disadvantage of recovery of a saline hydrothermal fluid with the attendant problems of scaling disposal. For the reasons discussed above, the downhole heat exchanger variant of the multiple-completion system is far preferable. Such a system is shown in FIG. 5.

In this system, the lower end 16 of each recovery well contains a plug 74 such as a metal-rubber layer over a cement layer. The terminal portion of the casing of each well contains or forms a closed heat exchanger 76. An injection pipe 78 delivers heat exchange fluid to the top 79 of the heat exchanger which is heated to form vapor therein. The vapor leaves through perforations 80 in the top 79 and rises through the annular space in each casing and collects within the reservoir 14 and after separation in separator 45 and conversion to electricity in turbine-generator 48 is recycled to storage tank 54 for reinjection as previously described.

The borehole is preferably cased with a metal casing which is in turn cased with a layer of concrete 81. For purposes of heat conduction to the heat exchanger 76, it is preferred that the metal surface 24 be directly exposed to the hydrothermal fluid. Referring again to FIG. 5, this installation is effected by lining the borehole with a metal casing 85. The casing is perforated at 77 at the location corresponding to the top of the heat exchanger 76.

The casing is then temporarily plugged directly below the perforations 77. Cement is delivered to the temporary plug area and squeezed through the perforations 77 to form a plug 81 in the annular area outside the casing 85. The upper casing 85 is then cased in cement. The temporary plug is then drilled out and the lower plug 74 is inserted and the top 79 of the heat exchanger is installed.

The closed-cycle system for extraction of heat from a geothermal zone provides a choice of heat exchange fluids such as isobutane or water. Demineralized water is the fluid of choice since its thermal and physical properties permit high heat transfer capabilities, and steam vapor is directly usable in conventional and economically available condensing steam turbines. Condensate is easily handled for return to the heat recovery zone. Also, demineralized water can be readily produced in conventional and economically available equipment and all of its physical properties and handling techniques are well known.

Figure 6:
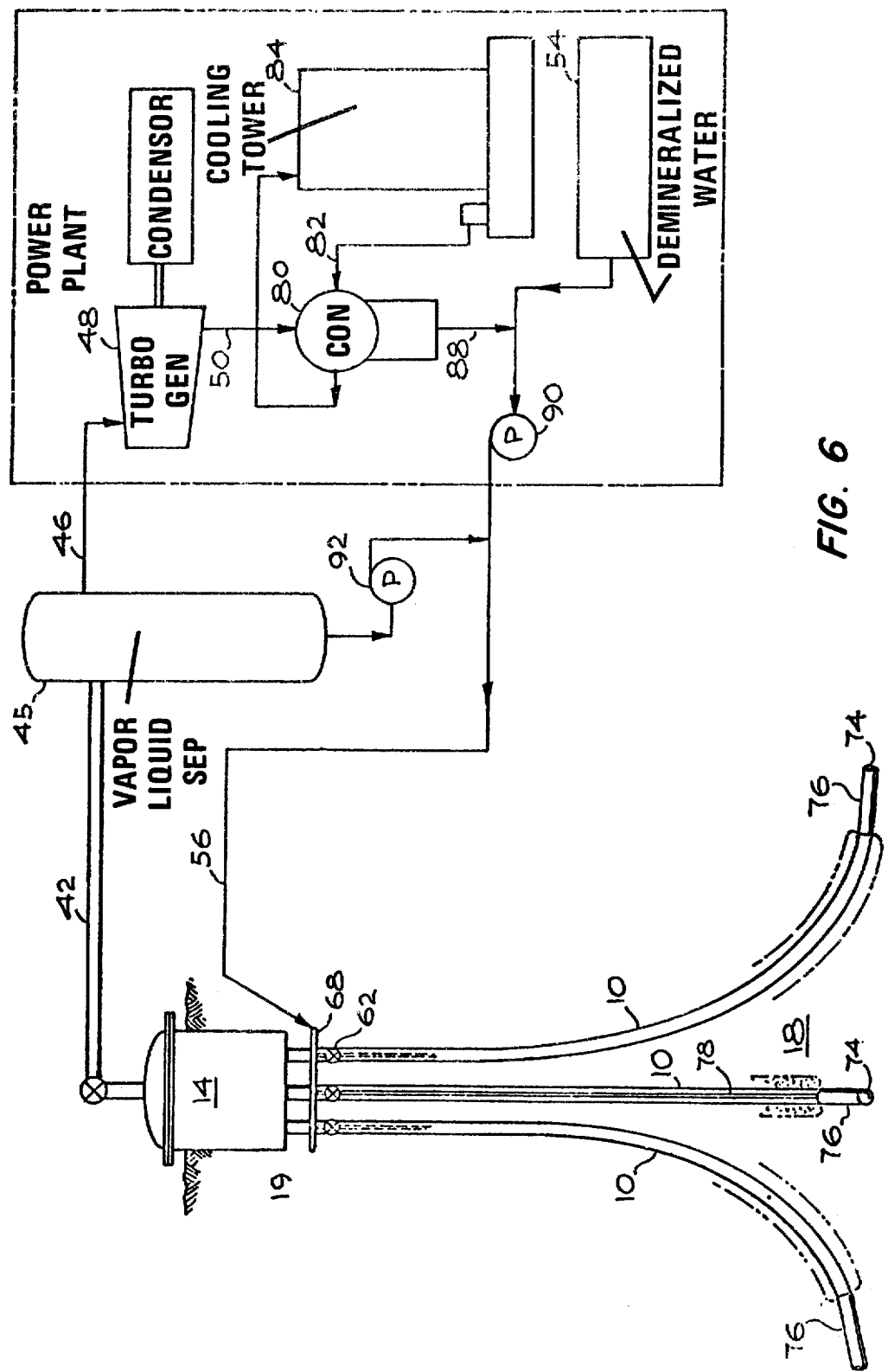
FIG. 6 is a plan view of a geothermal mining system in accordance with the invention.

A schematic illustration of a more detailed embodiment of the downhole heat exchanger is illustrated in FIG. 6. FIG. 6 has been designed for the recovery of sufficient heat energy for the production of 50 megawatts (at the generator terminals) of electric power.

Referring now to FIG. 6, the system includes a plurality of downhole heat exchanger recovery wells 10 having a plugged end 74 within a geothermal zone 18. The upper ends 19 of the wells 10 converge to and meet in a reservoir 14. The steam output from the reservoir is delivered through line 42 to a vapor-liquid separator 45, condensed through line 46 to a turbogenerator 48. The low pressure steam from the turbo generator is delivered through line 50 to a condenser 80 which receives a continuous supply of cold water circulating through circuit 82 containing a cooling tower 84. The condensate from condenser 80 joins line 56 through line 88. Demineralized water from supply tank 54 and the condensate are pumped by means of power condensate pump 90 and preheat condensate pump 92 to the injection ring 68.

In this system, the steam is vaporized within the outer casing while it passes through the reservoir geothermal heat zone 18. The inner pipe returns the condensate from the above-ground power plant turbine condenser and vapor-condensate separator down to the well bottom to complete the heat exchange fluid transport circuit. The inner pipe also serves to preheat the condensate up to the boiling thermal equilibrium established during operation. The preheating requires vapor condensation. This condensate is separated from the power vapor fluid in a vapor-condensate separator and recycled. The power vapor is used in a conventional condensing type vapor turbine in a totally enclosed recycle system and thus the power fluid is conserved. The power vapor turbine has an indirect exhaust vapor condenser and condensate recycle pumping system.

The following calculations for feasibility of the system of the invention were based on a heat assumed to have generally constant temperatures unaffected by the heat recovered. The generalized heat zone conditions assumed were starting at 3,000 feet below grade with a temperature of 500°F and extending 5,000 feet below grade to a temperature of 700°F. The heat zone was also assumed to be filled with hot brine under pressure, typical of the heat zone in the Niland area of the Imperial Valley. The geothermal zone 18 was assumed to be a porous sandstone filled with hot brine.

Under these conditions, the outside heat transfer from coefficients and fouling factors are the limiting elements for maximizing heat recovery from the brine into the heat exchange power fluid. The rate of heat removal is limited by heat zone porosity and permeability. If the assumed sand particle diameter is less than 0.039 inch (1 mm) in diameter, permeability rather than the outside-to-pipe film coefficient controls the rate of heat transfer.

On the basis of these criteria, the outer casing size of 13.375 inches O.D. is preferred since for the depth and temperature specified in the heat recovery zones this is about the largest size casing (heat transfer surface) which provides an economic weight (strength) per unit length required to withstand the internal and collapsing pressure encountered as well as the problems associated with offset drilling. The inner pipe will be selected to satisfy the overall system flow hydrodynamic requirements. It is expected that long life would be experienced with heavy wall carbon steel casings in the above conditions.

The same casing and cementing practices employed for other geothermal wells can be followed, the only difference being the closed end of the 13 ⅜ inch casing which acts as a shell of the downhole heat exchanger. A further advantage of the directional slant drilling multiple-completion system of the invention is that it provides greater heat exchange area within the zone of heat collection, thus reducing the amount of wells necessary to produce a given amount of power. By slant drilling through the 3,000 foot to 5,000 foot zone under consideration, it is estimated that 10 wells must be drilled to provide the desired heat exchange surface area. The typical casing requirements will require about 8,000 feet of the casing within the zone forming the heat exchanger which will be connected to 1800 feet of cemented production casing and then to 50 feet of cemented 20 inch second string which in turn is then connected to 50 feet of cemented 36 inch conductor casing. The top end 19 of the wells can readily be separated by 25 to 150 feet and can be located in the surface zone bounded by a single reservoir 14.

Each well at the bottom should produce steam at 320 psia and having a temperature of 423°F and having a temperature at the top after condensing the down-coming return condensate of 165 psia and a temperature of 366°F. At the vapor-liquid separator 45 such wells will provide 857,000 lbs. per hour vapor and 343,000 lbs. per hour of condensate. This vapor has an inert pressure of 130 psia and a temperature of 350°F to provide a heat input to the turbogenerator of $1023 \times 10^6$ Btu/hour and a heat rate of 20,500 Btu/kWh gross at the generated terminals. This is sufficient to provide 15 megawatts at the generated terminals. The condenser returns this vapor as power condensate at a rate of 1714 gallons per minute at a temperature of 125°F which combines with the preheat condensate at 773 gallons per minute to be returned to develop the necessary steam to power the system.

Feasibility was based on costs for well completion equipment, well gathering piping, condensate return piping, flash separator, flash water and condensate pumps. The estimate includes costs of all equipment, materials, direct and indirectly, freight taxes and insurance, engineering, contractors burden and profit and a 15% contingency and including costs of capital. The comparison of costs of energy produced with the system of the invention as contrasted with other sources is shown in the following table.

TABLE I

| | $/Million Btus | |
|---|---|---|
| Coal | 0.25 – 0.30 | |
| Oil (1% Sulfur) | 0.65 | |
| Natural Gas | 0.42 – 0.48 | |
| Synthetic Natural Gas | 1.05 – 1.75 | |
| Coal Based Synthetic Gas | 1.10 – 1.25 | |
| Van Huisen System | 0.19 – 0.37 | Gross at generator terminals* |

*Adjusted to heat rate equivalent of modern fossil fuel power plant rate of approximately 10,000 Btus/kWh.

Recent pollution regulations regarding maximum sulfur content in fuels of 0.3 to 0.5 percent have placed a considerable burden on refiners to produce low sulfur petroleum based fuels. It is estimated that the added processing may cost as much as $1.50 bbl or $0.24 per million Btus. Many coals run 3 to 4 percent sulfur and the only practical way to meet pollution standards is to desulfurize the stack gases which is estimated to add as much as $60–$70 kW in capital investment or $0.09–$0.11 per million Btus. Typical fuel costs in terms of mills/kWh for privately owned utilities as of 1969, run 3.5 to 6.5 mills/kWh. It is estimated that by 1975 fuel prices will roughly double and utilities will probably be paying 7.0 to 13 mills/kWh for fuel. The energy cost of 1.91 to 3.71 mills/kWh compares very favorably with competing fossil fuels for this module of power. No comparison could be made with nuclear fuel plants since nuclear fuel plants would be uneconomical to build in the range of 50 MW/150 MW.

It is to be realized that only preferred embodiments of the invention have been described and that numerous substitutions, alterations and modifications can readily be made by those skilled in the art without departing from the spirit and scope of the invention as defined in the following claims.

What is claimed is:

1. A method of recovering geothermal energy comprising the steps of:
   drilling a well from the surface into a geothermal zone;
   lining the borehole of the well with a metal casing;
   perforating the casing at a level within the upper portion of said zone and remote from the lower end of the casing;
   plugging the casing just below the perforation to form a first plug;
   squeezing cement through the perforation to form an annular cement ring exterior of the casing;
   cementing the outside of the casing from the surface to the annular ring to form an uncased lower barefoot extension of the metal casing;
   drilling out said plug;
   installing a plug at the lower end of the case to form a heat exchanger; and
   installing a central heat exchange fluid injection pipe within said casing.

2. A method according to claim 1 further including the step of injecting heat exchange fluid through said pipe into said heat exchanger and delivering the heated fluid therefrom through the annular passage between the casing and the pipe.

3. A method according to claim 1 in which a plurality of said wells are slant drilled in a radial pattern from a common point.

4. A method according to claim 3 further including the step of installing a collection reservoir at said point and connecting the outlet end of each of said annular delivery passages to said reservoir to collect heated fluid therein.

5. A method according to claim 4 in which the reservoir is submerged below the surface of the earth.

6. A method according to claim 2 in which the heat exchange fluid is water and the heated heat exchange fluid is steam.

* * * * *